United States Patent
Wang et al.

(10) Patent No.: US 10,768,983 B2
(45) Date of Patent: Sep. 8, 2020

(54) MECHANISM FOR FACILITATING A QUORUM-BASED COORDINATION OF BROKER HEALTH FOR MANAGEMENT OF RESOURCES FOR APPLICATION SERVERS IN AN ON-DEMAND SERVICES ENVIRONMENT

(71) Applicant: salesforce.com, inc., San Francisco, CA (US)

(72) Inventors: Xiaodan Wang, Dublin, CA (US); John Buisson, Largo, FL (US); Vijayanth Devadhar, Fremont, CA (US); Praveen Murugesan, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 425 days.

(21) Appl. No.: 13/841,588

(22) Filed: Mar. 15, 2013

(65) Prior Publication Data

US 2014/0075017 A1  Mar. 13, 2014

Related U.S. Application Data

(60) Provisional application No. 61/708,283, filed on Oct. 1, 2012, provisional application No. 61/711,837, filed
(Continued)

(51) Int. Cl.
  *G06F 9/50* (2006.01)
  *G06Q 30/08* (2012.01)
  (Continued)

(52) U.S. Cl.
  CPC .............. *G06F 9/50* (2013.01); *G06F 9/5027* (2013.01); *G06F 21/40* (2013.01); *G06Q 30/08* (2013.01);
  (Continued)

(58) Field of Classification Search
  CPC .......... G06F 21/40; G06F 9/50; G06F 9/5027; G06F 2209/508; G06Q 30/08;
  (Continued)

(56) References Cited

U.S. PATENT DOCUMENTS 5,432,926 A * 7/1995 Citron ............... G06F 17/30371
                                                709/237
5,577,188 A    11/1996 Zhu
(Continued)

FOREIGN PATENT DOCUMENTS

EP    1510917        3/2005
EP    2895954 A1     7/2015
(Continued)

OTHER PUBLICATIONS

PCT/US2013/045509, Notification of Transmittal of the International Searching Report and the Written Opinion of the International Searching Authority, dated Oct. 9, 2013.
(Continued)

*Primary Examiner* — Patrice L Winder
*Assistant Examiner* — Angela M Widhalm De Rodrig
(74) *Attorney, Agent, or Firm* — Jaffery Watson Mendonsa & Hamilton LLP

(57) ABSTRACT

In accordance with embodiments, there are provided mechanisms and methods for facilitating a quorum-based coordination of broker health for management of resources for application servers in an on-demand services environment. In one embodiment and by way of example, a method includes monitoring, via health checkers, health of a cluster of brokers in a distributed environment having application servers in communication over a network, receiving an indication from at least one health checker that a broker is failing, wherein the broker is associated with a cluster of worker nodes, collecting health status reports relating to the
(Continued)

broker from the health checkers, examining the health status reports based on a quorum-based voting policy, and classifying the broker as unhealthy if, based on the quorum-based voting policy, a percentage of the health status reports regards the broker as failed, wherein the percentage is greater than a first threshold percentage.

12 Claims, 9 Drawing Sheets

Related U.S. Application Data on Oct. 10, 2012, provisional application No. 61/709,263, filed on Oct. 3, 2012, provisional application No. 61/700,032, filed on Sep. 12, 2012, provisional application No. 61/700,037, filed on Sep. 12, 2012.

(51) Int. Cl.
  *H04L 12/26* (2006.01)
  *H04L 12/911* (2013.01)
  *H04L 12/24* (2006.01)
  *H04L 12/863* (2013.01)
  *G06F 21/40* (2013.01)

(52) U.S. Cl.
  CPC .............. *H04L 41/30* (2013.01); *H04L 43/08* (2013.01); *H04L 47/50* (2013.01); *H04L 47/70* (2013.01); *G06F 2209/508* (2013.01)

(58) Field of Classification Search
  CPC ......... H04L 41/30; H04L 41/50; H04L 47/50; H04L 47/70; H04L 43/08
  See application file for complete search history.

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,909,540 A * | 6/1999 | Carter ................. G06F 9/5016 707/E17.12 |
| 5,918,159 A | 6/1999 | Fomukong et al. |
| 5,937,205 A | 8/1999 | Mattson |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,263,359 B1 | 7/2001 | Fong et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,260,589 B2 * | 8/2007 | Cotner ............. G06F 17/30371 707/684 |
| 7,289,976 B2 | 10/2007 | Kihneman et al. |
| 7,340,411 B2 | 3/2008 | Cook |
| 7,363,346 B2 * | 4/2008 | Groner ................ G06F 11/1076 709/214 |
| 7,620,655 B2 | 11/2009 | Larsson et al. |
| 7,640,339 B1 * | 12/2009 | Caronni ............. H04L 43/0817 709/220 |
| 7,706,895 B2 * | 4/2010 | Callaghan .............. G06Q 10/00 700/17 |
| 7,730,478 B2 | 6/2010 | Weissman |
| 8,082,234 B2 * | 12/2011 | Brown .............. G06F 17/30575 707/690 |
| 8,321,558 B1 | 11/2012 | Sirota et al. |
| 8,458,715 B1 * | 6/2013 | Khosla ....................... G06F 9/50 702/104 |
| 8,504,691 B1 | 8/2013 | Tobler et al. |
| 8,527,473 B1 * | 9/2013 | Brown .............. G06F 17/30557 707/675 |
| 8,775,591 B2 * | 7/2014 | Bobak .................... G06Q 10/06 709/223 |
| 8,949,839 B2 | 2/2015 | Balasubramaniam |
| 9,268,605 B2 | 2/2016 | Wang et al. |
| 9,292,466 B1 * | 3/2016 | Vincent ................... G06F 15/16 |
| 2001/0044791 A1 | 11/2001 | Richter et al. |
| 2001/0051890 A1 * | 12/2001 | Burgess ................. G06Q 10/06 705/7.14 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033191 A1 | 2/2003 | Davies et al. |

(56) References Cited

U.S. PATENT DOCUMENTS

| | | |
|---|---|---|
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0215614 A1* | 10/2004 | Doyle ................. G06F 9/50 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183084 A1 | 8/2005 | Cuomo et al. |
| 2005/0223022 A1 | 10/2005 | Weissman et al. |
| 2006/0122927 A1 | 6/2006 | Huberman |
| 2007/0016663 A1* | 1/2007 | Weis ................. G06F 11/2028 709/223 |
| 2007/0055554 A1 | 3/2007 | Sussman |
| 2007/0091841 A1 | 4/2007 | Bhushan et al. |
| 2007/0237078 A1* | 10/2007 | Hundscheidt ....... H04L 12/5692 370/235 |
| 2007/0239858 A1* | 10/2007 | Banerji ................. G06Q 30/06 709/220 |
| 2007/0254628 A1 | 11/2007 | Rybak |
| 2007/0256077 A1 | 11/2007 | Zhong |
| 2008/0120129 A1 | 5/2008 | Seubert et al. |
| 2008/0178187 A1 | 7/2008 | Altshuler |
| 2009/0119080 A1* | 5/2009 | Gray ................. G05B 17/02 703/8 |
| 2009/0164635 A1 | 6/2009 | Denker |
| 2009/0177356 A1* | 7/2009 | Plawecki ............ G05B 9/03 701/45 |
| 2009/0177744 A1 | 7/2009 | Marlow et al. |
| 2009/0201935 A1 | 8/2009 | Hass et al. |
| 2009/0265205 A1 | 10/2009 | Stinchcombe |
| 2009/0287592 A1 | 11/2009 | Brooks et al. |
| 2010/0049570 A1 | 2/2010 | Li et al. |
| 2010/0076805 A1 | 3/2010 | Batsakis |
| 2010/0103938 A1 | 4/2010 | Musoll et al. |
| 2010/0229218 A1 | 9/2010 | Kumbalimutt et al. |
| 2010/0235887 A1 | 9/2010 | Burch et al. |
| 2011/0131645 A1* | 6/2011 | Johnson ............ G06F 11/0709 726/12 |
| 2011/0231457 A1 | 9/2011 | Tager et al. |
| 2011/0296515 A1 | 12/2011 | Krstic et al. |
| 2012/0011518 A1 | 1/2012 | Duan et al. |
| 2012/0192194 A1 | 7/2012 | Richardson |
| 2012/0304197 A1* | 11/2012 | Talbert ................ G06F 9/485 719/313 |
| 2012/0311153 A1 | 12/2012 | Morgan |
| 2012/0330913 A1* | 12/2012 | Devadhar ............ G06F 11/1446 707/703 |
| 2013/0024496 A1* | 1/2013 | Krishnan ............ G06F 9/505 709/203 |
| 2013/0060834 A1 | 3/2013 | Paramasivam |
| 2013/0080559 A1* | 3/2013 | Rao ................. H04L 67/1097 709/208 |
| 2013/0111031 A1 | 5/2013 | Hoffmann |
| 2013/0262931 A1* | 10/2013 | Siddalingesh ...... G06F 11/3672 714/28 |
| 2014/0047201 A1* | 2/2014 | Mehta ................. G06F 13/00 711/158 |
| 2014/0068620 A1* | 3/2014 | Factor ................. G06F 9/5027 718/102 |
| 2014/0074641 A1 | 3/2014 | Wang |
| 2014/0075017 A1 | 3/2014 | Wang et al. |
| 2014/0075445 A1 | 3/2014 | Wang et al. |
| 2014/0289418 A1 | 9/2014 | Cohen et al. |
| 2015/0066587 A1 | 3/2015 | Glommen |
| 2017/0033212 A1* | 2/2017 | Siemieniec ........... H01L 21/046 |

FOREIGN PATENT DOCUMENTS

| | | |
|---|---|---|
| GB | 2475897 | 6/2011 |
| JP | H0816410 B2 | 2/1996 |
| JP | 2004050550 A | 2/2004 |
| JP | 2008204243 A | 9/2008 |
| JP | 2010522931 A | 7/2010 |
| WO | 2009040901 A1 | 4/2009 |

OTHER PUBLICATIONS

PCT International Preliminary Report on Patentability and Written Opinion of the International Searching Authority, International Application No. PCT/US2013/045509 dated Mar. 17, 2015, 5 pgs.

PCT/US2013/045511, Notification of Transmittal of the International Search Report and the Written Opinion of the International Searching Authority dated Oct. 9, 2013, 8 pgs.

U.S. Appl. No. 13/841,417 Non-Final Office Action dated Dec. 24, 2015, 13 pages.

U.S. Office Action from U.S. Appl. No. 14/614,146, dated Mar. 10, 2017, 8 pages.

Corrected Notice of Allowance for U.S. Appl. No. 13/841,649 dated Feb. 29, 2016, 2 pages.

Examination Report for Canadian Patent Application No. 2,883,883 dated Apr. 26, 2016, 4 pages.

Examination Report for Canadian Patent Application No. 2,883,883 dated Mar. 31, 2017, 3 pages.

Final Office Action for U.S. Appl. No. 13/841,417 dated Aug. 13, 2015, 10 pages.

Final Office Action for U.S. Appl. No. 13/841,489 dated Feb. 11, 2016, 27 pages.

Final Office Action for U.S. Appl. No. 13/841,649 dated Oct. 21, 2015, 19 pages.

Final Office Action for U.S. Appl. No. 14/634,289 dated Apr. 6, 2017, 18 pages.

International Preliminary Report on Patentability for PCT/US2013/045511 dated Mar. 26, 2015, 6 pages.

Non-Final Office Action for U.S. Appl. No. 13/841,417 dated Mar. 19, 2015, 13 pages.

Non-Final Office Action for U.S. Appl. No. 13/841,649 dated May 8, 2015, 15 pages.

Non-Final Office Action for U.S. Appl. No. 13/841,713 dated Apr. 9, 2015, 10 pages.

Non-Final Office Action for U.S. Appl. No. 14/634,289 dated Oct. 18, 2017, 17 pages.

Non-Final Office Action for U.S. Appl. No. 14/634,289 dated Sep. 12, 2016, 16 pages.

Notice of Allowance for U.S. Appl. No. 13/841,417 dated Aug. 5, 2016, 7 pages.

Notice of Allowance for U.S. Appl. No. 13/841,649 dated Jan. 25, 2016, 13 pages.

Notice of Allowance for U.S. Appl. No. 13/841,713 dated Sep. 25, 2015, 25 pages.

(56) References Cited

OTHER PUBLICATIONS

Second Office Action for Chinese Application No. 201380047246.8 dated Jan. 2, 2018, 6 pages.
Notice of Allowance for U.S. Appl. No. 14/634,289 dated May 22, 2018, 9 pages.
Office Action for Japanese Application No. 2015-531916 dated Feb. 27, 2018, 11 pages.
U.S. Office Action from U.S. Appl. No. 13/841,489, dated Nov. 14, 2017, 13 pages.
U.S. Office Action from U.S. Appl. No. 14/526,185, dated Oct. 11, 2017, 23 pages.
First Office Action for Chinese Application No. 201380047246.8 dated Jun. 23, 2017, 6 pages.
Non-Final Office Action for U.S. Appl. No. 13/841,489 dated Apr. 24, 2017, 18 pages.
Office Action for Japanese Application No. 2015-531916 dated Jun. 20, 2017, 11 pages.
Canadian Application No. 2,883,883 Examination Report, dated Jun. 9, 2018, 3 pages.
U.S. Appl. No. 14/634,289 Notice of Allowance, dated May 22, 2018, 9 pages.
U.S. Appl. No. 14/526,185 Final Office Action, dated Jul. 13, 2018, 18 pages.
U.S. Appl. No. 13/841,489 Notice of Allowance, dated Jul. 9, 2018, 14 pages.
Shum, K. H. (1997). Replicating parallel simulation on heterogeneous clusters. Journal of Systems Architecture, 44(3-4), 273-292.
Non-Final Office Action for U.S. Appl. No. 14/526,185 dated Mar. 4, 2019, 9 pages.
Notice of Allowance for Canadian Patent Application No. 2,883,883 dated May 6, 2019, 1 page.
Corrected Notice of Allowability for U.S. Appl. No. 13/841,489 dated Aug. 1, 2018, 4 pages.
Notice of Allowance for Japanese Application No. 2015-531916 dated Sep. 18, 2018, 3 pages.
Notification of Grant for Chinese Application No. 201380047246.8 dated Jul. 18, 2018, 4 pages.
Supplemental Notice of Allowability for U.S. Appl. No. 14/634,289 dated Aug. 1, 2018, 2 pages.
Communication pursuant to Article 94(3) EPC, EP Application No. 13 731 595.8, dated Oct. 1, 2019, 9 pages.
Lee, Juong-Sik, Recurrent auctions in e-commerce, Rensslaer Polytechnic Institute, ProQuest Dissertations Publishing 2007, 3299458, 2 pages, downloaded from ProQuestDirect on the Internet on Sep. 21, 2015.
U.S. Appl. No. 13/841,489, Non-Final Office Action, dated Sep. 30, 2015.
Final Office Action for U.S. Appl. No. 14/526,185 dated Apr. 21, 2020, 9 pages.
Notice of Allowance for Japanese Application No. 2018-196455 dated Feb. 4, 2020, 6 pages.

\* cited by examiner

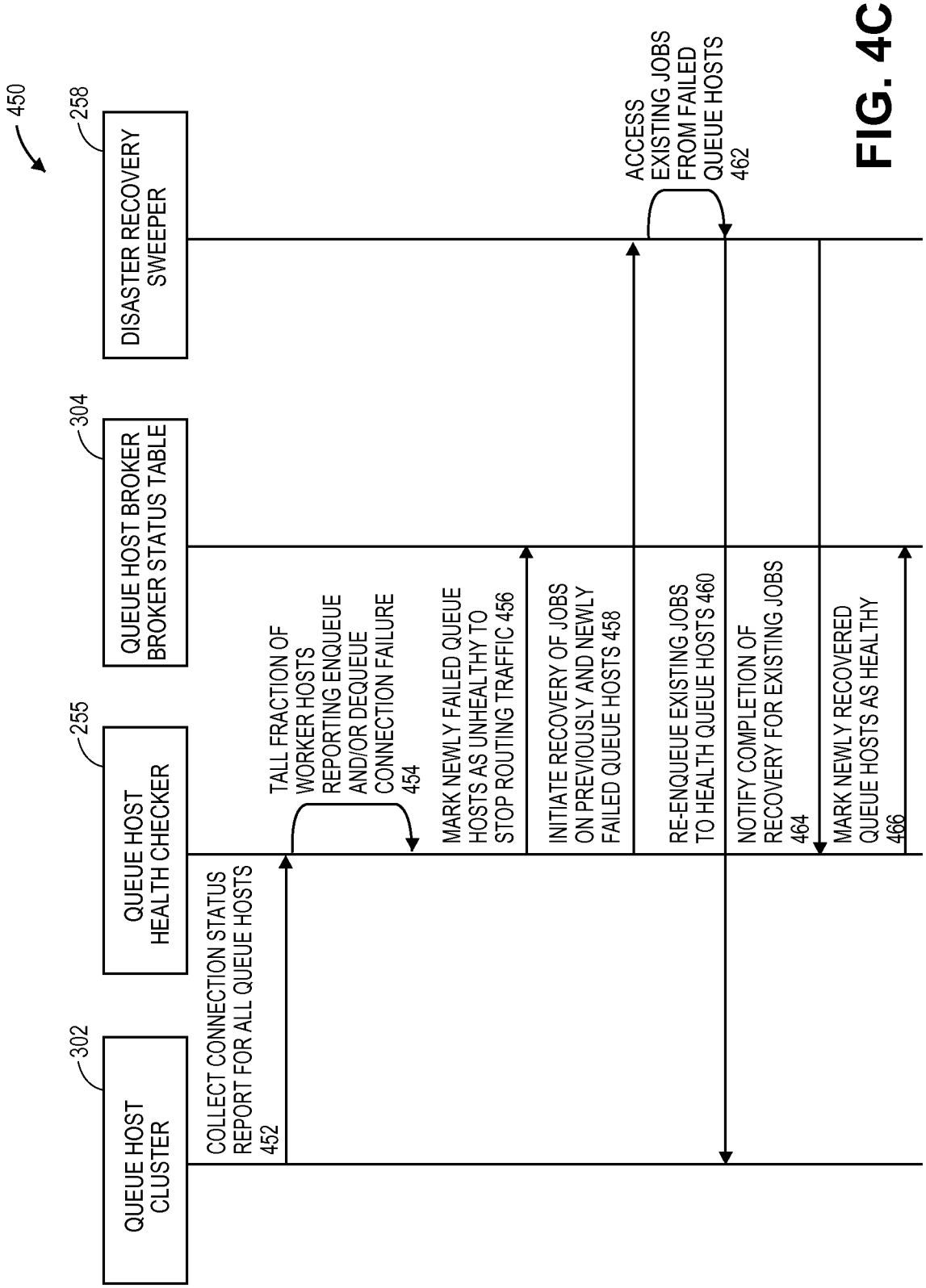

MECHANISM FOR FACILITATING A QUORUM-BASED COORDINATION OF BROKER HEALTH FOR MANAGEMENT OF RESOURCES FOR APPLICATION SERVERS IN AN ON-DEMAND SERVICES ENVIRONMENT

CLAIM OF PRIORITY

This application claims the benefit of U.S. Provisional Patent Application No. 61/708,283, entitled "System and Method for Allocation of Resources in an On-Demand System" by Xiaodan Wang, et al., filed Oct. 1, 2012, U.S. Provisional Patent Application No. 61/711,837, entitled "System and Method for Auction-Based Multi-Tenant Resource Sharing" by Xiaodan Wang, filed Oct. 10, 2012, U.S. Provisional Patent Application No. 61/709,263, entitled "System and Method for Quorum-Based Coordination of Broker Health" by Xiaodan Wang, et al., filed Oct. 3, 2012, U.S. Provisional Patent Application No. 61/700,032, entitled "Adaptive, Tiered, and Multi-Tenant Routing Framework for Workload Scheduling" by Xiaodan Wang, et al., filed Sep. 12, 2012, U.S. Provisional Patent Application No. 61/700,037, entitled "Sliding Window Resource Tracking in Message Queue" by Xiaodan Wang, et al., filed Sep. 12, 2012, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating a quorum-based coordination of broker health for management of resources for application servers in an on-demand services environment.

BACKGROUND

Large-scale cloud platform vendors and service providers receive millions of asynchronous and resource-intensive customer requests each day that make for extremely cumbersome resource allocation and scalability requirements for the service providers. Most customers get frustrated waiting for their request to be fulfilled because none of the conventional techniques provide for any real-time guarantees in responding to such requests. Moreover, multi-tenancy means that multiple users compete for a limited pool of resources, making it even more complex to ensure proper scheduling of resources in a manner that is consistent with customer expectations.

Distributing point of delivery resources, such as application server thread time, equitably among different types of messages has been a challenge, particularly in a multi-tenant on-demand system. A message refers to a unit of work that is performed on an application server. Messages can be grouped into any number of types, such as roughly 300 types, ranging from user facing work such as refreshing a report on the dashboard to internal work, such as deleting unused files. As such, messages exhibit wide variability in the amount of resources they consume including thread time. This can lead to starvation by long running messages, which deprive short messages from receiving their fair share of thread time. When this impacts customer-facing work, such as dashboard, customers are likely to dislike and complain when faced with performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4C illustrates a transaction sequence facilitating a quorum-based coordination of broker health for management of resources for application servers in a multi-tenant environment in an on-demand services environment according to one embodiment;

SUMMARY

Figure 1:
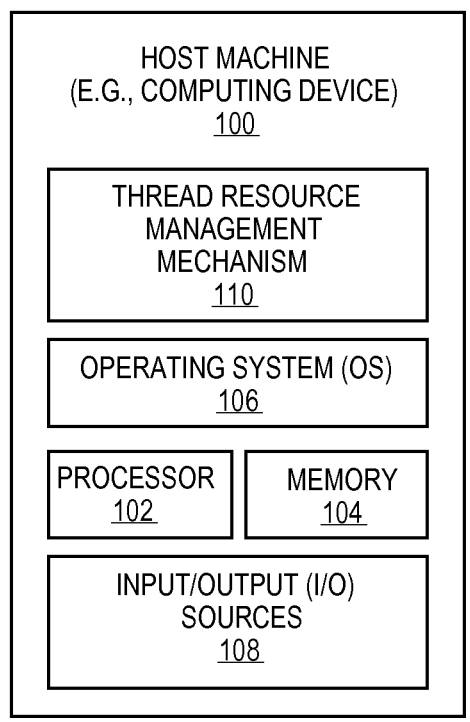
FIG. 1 illustrates a computing device employing a thread resource management mechanism according to one embodiment.

In accordance with embodiments, there are provided mechanisms and methods for facilitating a fair allocation and usage of thread resources for user messages according to one embodiment in an on-demand services environment. In one embodiment and by way of example, a method includes monitoring, via health checkers, health of a cluster of brokers in a distributed environment having application servers in communication over a network, receiving an indication from at least one health checker that a broker is failing, wherein the broker is associated with a cluster of worker nodes, collecting health status reports relating to the broker from the health checkers, examining the health status reports based on a quorum-based voting policy, and classifying the broker as unhealthy if, based on the quorum-based voting policy, a percentage of the health status reports regards the broker as failed, wherein the percentage is greater than a first threshold percentage.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating a quorum-based coordination of broker health for management of resources for application servers in an on-demand services environment. In one embodiment and by way of example, a method includes monitoring, via health checkers, health of a cluster of brokers in a distributed environment having application servers in communication over a network, receiving an indication from at least one health checker that a broker is failing, wherein the broker is associated with a cluster of worker nodes, collecting health status reports relating to the broker from the health checkers, examining the health status reports based on a quorum-based voting policy, and classifying the broker as unhealthy if, based on the quorum-based voting policy, a percentage of the health status reports regards the broker as failed, wherein the percentage is greater than a first threshold percentage.

Large-scale cloud platform vendors and service providers receive millions of asynchronous and resource-intensive customer requests each day that make for extremely cumbersome resource utilization and continued scalability for the service providers. Moreover, multi-tenancy means that multiple users compete for a limited pool of resources, making it even more complex to ensure proper scheduling of resources in a manner that is consistent of customer expectations.

Embodiments provide a suite of novel instrumentation for monitoring the health of message queue brokers associated with message queues in a distributed environment to provide high availability and disaster recovery guarantees. More particularly, in one embodiment, a mechanism is employed to provide a quorum-based voting protocol such that multiple application servers may coordinate decisions regarding message queue broker health of message queues to arrive at a global consensus. For example and in one embodiment, the mechanism includes a monitor for monitoring broker health via sessions (e.g., JAVA® Message Service® (JMS) sessions, etc.) and reporting as well as repairing connections to the broker in a timely manner.

Embodiments facilitate a two-tiered disaster recovery strategy that leverages the existing disaster recovery infrastructure on top of an existing system; namely, it can allow recovery from failed brokers by re-populating lost messages to either the remaining healthy brokers or to an existing queuing infrastructure (e.g., ORACLE® Advance Queue (AQ) queuing infrastructure, etc.).

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating a mechanism for employing and providing a quorum-based coordination of broker health for management of resources for application servers in a multi-tenant environment in an on-demand services environment will be described with reference to example embodiments.

FIG. 1 illustrates a computing device 100 employing a thread resource management mechanism 110 according to one embodiment. In one embodiment, computing device 100 serves as a host machine employing a thread resource management mechanism ("resource mechanism") 110 for message queues for facilitating dynamic management of application server thread resources facilitating fair and efficient management of thread resources and their corresponding messages, including their tracking, allocation, routing, etc., for providing better management of system resources as well as promoting user-control and customization of various services typically desired or necessitated by a user (e.g., a company, a corporation, an organization, a business, an agency, an institution, etc.). The user refers to a customer of a service provider (e.g., Salesforce.com) that provides and manages resource mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "request" and "message" may be used interchangeably throughout this document.

Figure 2:
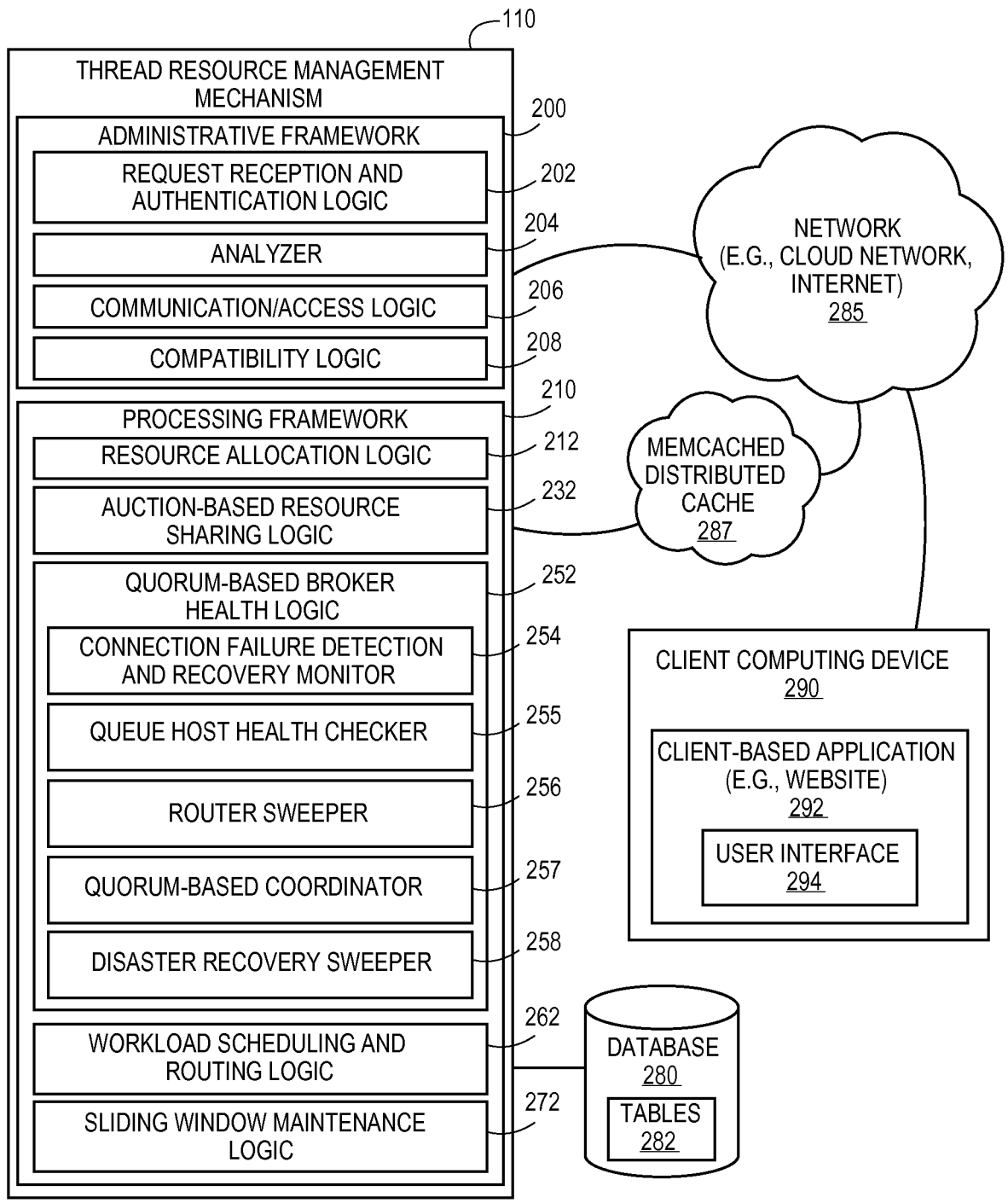
FIG. 2 illustrates a thread resource management mechanism including a quorum-based broker health logic according to one embodiment.

FIG. 2 illustrates thread resource management mechanism 110 including quorum-based broker health logic 252 according to one embodiment. In one embodiment, thread resource management mechanism ("resource management") 110 includes quorum-based broker health logic ("quorum logic") 252 to provide a novel instrumentation for monitoring and managing the health of message queue brokers for message queues in a distributed environment to provide high availability and disaster recovery guarantees facilitating a fair allocation of thread resources among competing message types at a point of delivery. More particularly, in one embodiment, quorum logic 252 employs a quorum-based voting protocol such that any number and type of application servers can coordinate decisions about message queue broker health to arrive at a global consensus.

In the illustrated embodiment, resource mechanism 110 may include various components, such as administrative framework 200 including request reception and authentication logic 202, analyzer 204, communication/access logic 206, and compatibility logic 208. Resource mechanism 110 further includes additional components, such as processing framework 210 having resource allocation logic 212, auction-based resource sharing logic 232, quorum-based broker health logic 252, workload scheduling routing logic 262, and sliding window maintenance logic 272.

It is contemplated that any number and type of components may be added to and/or removed from resource mechanism 110 to facilitate various embodiments including adding, removing, and/or enhancing certain features. For brevity, clarity, and ease of understanding of resource mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, resource mechanism 110 may be in communication with database 280 to store data, metadata, tables, reports, etc., relating to messaging queues, etc. Resource mechanism 110 may be further in communication with any number and type of client computing devices, such as client computing device 290 over network 285. Throughout this document, the term "logic" may be interchangeably referred to as "framework" or "component" or "module" and may include, by way of example, software, hardware, and/or any combination of software and hardware, such as firmware. This combination of components provided through resource mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 294 at client computing device 292 and over network 290.

It is contemplated that a user may include an administrative user or an end-user. An administrative user may include an authorized and/or trained user, such as a system administrator, a software developer, a computer programmer, etc. In contrast, an end-user may be any user that can access a client computing device, such as via a software application or an Internet browser. In one embodiment, a user, via user interface 294 at client computing device 290, may manipulate or request data as well as view the data and any related metadata in a particular format (e.g., table, spreadsheet, etc.) as desired or necessitated by the user. Examples of users may include, but are not limited to, customers (e.g., end-user) or employees (e.g., administrative user) relating to organizations, such as organizational customers (e.g., small and large businesses, companies, corporations, academic institutions, government agencies, non-profit organizations, etc.) of a service provider (e.g., Salesforece.com). It is to be noted that terms like "user", "customer", "organization", "tenant", "business", "company", etc., may be used interchangeably throughout this document.

In one embodiment, resource mechanism 110 may be employed at a server computing system, such as computing device 100 of FIG. 1, and may be in communication with one or more client computing devices, such as client computing device 290, over a network, such as network 285 (e.g., a cloud-based network, the Internet, etc.). As aforementioned, a user may include an organization or organizational customer, such as a company, a business, etc., that is a customer to a provider (e.g., Salesforce.com) that provides access to resource mechanism 110 (such as via client computer 290). Similarly, a user may further include an individual or a small business, etc., that is a customer of the organization/organizational customer and accesses resource mechanism 110 via another client computing device. Client computing device 290 may be the same as or similar to computing device 100 of FIG. 1 and include a mobile computing device (e.g., smartphones, tablet computers, etc.) or larger computers (e.g., desktop computers, server computers, etc.).

In one embodiment, resource mechanism 110 facilitates fair and efficient management of message routing and queues for efficient management of system resources, such as application servers, etc., and providing better customer service, where the users may accessing these services via user interface 294 provided through any number and type of software applications (e.g., websites, etc.) employing social and business networking products, such as Chatter® by Salesforce.com, Facebook®, LinkedIn®, etc.

In one embodiment, request reception and authentication logic 202 may be used to receive a request (e.g., print a document, move a document, merge documents, run a report, display data, etc.) placed by a user via client computing device 290 over network 285. Further, request reception and authentication logic 202 may be used to authenticate the received request as well as to authenticate the user (and/or the corresponding customer) and/or computing device 290 before the user is allowed to place the request. It is contemplated that in some embodiments, the authentication process may be a one-time process conducted when computing device 290 is first allowed access to resource mechanism 110 or, in some embodiments, authentication may be a recurring process that is performed each time a request is received by request reception and authentication logic 202 at resource mechanism 110 at the cloud-based server computing device via network 285.

Once the authentication process is concluded, the request is sent to analyzer 204 to analysis and based on the results of the analysis, the request is forwarded on to processing framework 210 for proper processing by one or more components 212, 232, 252, 262, 272 and their sub-components. Communication/access logic 206 facilitates communication between the server computing device hosting resource mechanism 110 and other computing devices including computing device 290 and other client computing devices (capable of being accessed by any number of users/customers) as well as other server computing devices. Compatibility logic 208 facilitates dynamic compatibility between computing devices (e.g., computing device 290), networks (e.g., network 285), any number and type of software packages (e.g., websites, social networking sites, etc.).

In one embodiment, resource mechanism 110 and its quorum logic 252 allows for a quorum-based approach to achieve fair and efficient allocation of resources in a multi-tenant environment. In one embodiment, quorum logic 252 may be used so that messages sent to the queues may be resilient against both isolated server failures and data center outages; for example, quorum logic 252 includes connection failure detection and recovery monitor 254 (also referred to as "exception listener and reconnect module" or "ELR module" or simply "monitor") 254 that runs locally on an application server to continuously monitor the health of the application server to detect any problems or potential failure in connection with the brokers so that any messages may be preserved in case of a failure. However, in case of a failure, detection and recovery monitor 254 may rapidly detect and repair any failed brokers and, if the application server fails to re-establish connection to the corresponding broker, detection and recovery monitor 254 may quickly report the failure. Quorum logic 252 further includes queue host health checker (also referred to as "health checking module" or simply "health checker") 255 to collect information regarding broker health from all application servers and employs a quorum-based and voting protocol to detect broker failures. Health checker 255 is another component of quorum logic 252 to detect both broker crashes and partial failures. Router sweeper 256 re-routes incoming traffic to the remaining healthy brokers to ensure availability. Quorum-based coordinator 257 for coordination of broker health for high availability and recovery ("HADR") sweeper (also referred to as "HADR sweeper" or "disaster recovery sweeper") 258 that can recover lost messages by leveraging the existing HADR infrastructure on top of an existing one (e.g., Oracle AQ). Quorum logic 252 access and use tables 282 at database 280, where tables 282 include any number and type of tables, such as queue host broker status table ("broker table") 304 and transaction table or recovery job table 306 of FIG. 3 and routing table, etc. Further, quorum logic 252 facilitates communication with and the use of memcached distributed cache ("mem-cache") 287, over network 285, where mem-cache 287 may be located at an application server which may include the host server computing device (e.g., host machine 100 of FIG. 1) that hosts resource mechanism 110 or may include any number and type of remote computing systems in communication with the host server computing device and/or any number and type of client computing systems, such as client computing device 290.

In one implementation, quorum logic 252 ensures that the new quorum-based message queue infrastructure remains resilient in the presence of hardware failures. It further provides health checker 255 for quorum-based voting and monitoring of brokers, monitor 254 for local detection and repair of brokers, repairing routing table and re-routing traffic to healthy brokers by router sweeper 256, while the lost messages are recovered by disaster recovery sweeper 258. Health checker 255 then arrives at a global consensus across all application servers regarding the health of each broker. Once health checker 255 determines that a broker can no longer be accessed reliably and a large subset of application servers can no longer connect to the broker, it sets the broker status in a broker table (e.g., QPID_BROKER table) as INACTIVE. Once a failed broker is detected, both the router sweeper job and the disaster recovery sweeper jobs are triggered.

Further, local enqueue and dequeue session pools on each application server may remain unchanged while health checker 255 decides to mark a broker as INACTIVE. If an application server can no longer connect to the failed broker, it may continue to retry the connection after the broker is marked INACTIVE, whereas if an application server is still able to connect to the INACTIVE broker, it may continue to maintain the connection. Eventually, the routing table may remove all references to the INACTIVE broker.

Caching Broker Status

To disseminate decisions regarding the status of each broker, health checker 255 may update the broker status value in the broker table (e.g., QPID_BROKER table) and in turn, this table is cached by each application server, which can then determine the list of INACTIVE brokers. This information is used for a router sweeper job by router sweeper 256 as follows: when a broker is INACTIVE, any routing rule that points to a queue on the INACTIVE broker is replaced by a queue on the ACTIVE broker. Disaster recovery sweeper 258 uses this information for a disaster recovery sweeper job to migrate messages from INACTIVE to ACTIVE brokers. The broker status cache is refreshed from database 280 (or any number and type of other databases remotely in communication with the host computing device, such as computing device 100 of FIG. 1, and resource mechanism 110) for every defined period of time, such as 2 minutes, and to avoid multiple application servers contending for database 280 and other databases, the broker status may be stored in a distributed cache, such as a local mem-cache 287, with a defined expiration time period, such as 2 minutes. This is to ensure that any subsequent attempts to refresh the local application server's cache of broker statuses are served from mem-cache 287.

Broker Failure Detection

It is contemplated that most application servers may independently detect a broker death and that this detection may be done in an initializer (e.g., qpid initializer) when an application server is attempting to establish a connection to each broker either during application start-up or after a prior connection loss. After each failed attempt, the application server may record the failure in mem-cache 287, where each application server may write to mem-cache 287 a list of brokers to which it cannot maintain a connection and further records whether it is part of the dequeue cluster pool. For example, any number of such lists (e.g., 30 or more lists) may be stored at mem-cache 287 for the corresponding application server.

Global Consensus

In one embodiment, the aforementioned health checker process may run for a predetermined amount of time, such as every 5 minutes, on each of the corresponding servers and perform the following: 1) acquire a distributed lock to monitor that two health checker processes are not contending to ensure correctness and that the two health checker process do not make conflicting decisions in which one health checker marks one broker, such as broker A, as failed and attempts to sweep to another broker, such as broker B, while another health checker marks broker B as failed and attempts to sweep to broker A; 2) reads the old status of each broker from the QPID_BROKER table; and 3) determines the current status of each broker based on failed broker list from mem-cache 287 and iterates through each broker and acts on those brokers where status is determined to have changed.

Determine the Current Broker Status

In one embodiment, quorum logic 232 is used to detect broker health, where health checker 255 reads the list of failed brokers from mem-cache 287 for all application servers and counts the number of occurrences. The number of occurrences may indicate a number of application servers that may not connect to a given broker and once this number crosses a pre-set threshold, the broker is regarded to have been failed. This in turn allows health checker 255 to determine the status of each broker at the current point in time based on all reporting application servers. In some embodiments, the broker death threshold is kept high enough to ignore any transient issues (e.g., broker temporarily not responding to one or two application servers) but not so high as to mask any issues that can potentially and severely impact performance. In other words, two separate thresholds may be used, such as that one threshold is based on all application servers reporting, while the other threshold may be based on application servers that are part of the dequeue cluster. Across all application servers, if a majority of the application servers detected a broker failure, then that broker is regarded as failed globally. Across application servers that belong to a dequeue cluster, if at least 25% of the application servers detect a broker failure, then that broker is regarded as failed globally. Once a broker is considered failed, it may not be marked healthy again until at least 90% of the application servers are able to connect to the broker. This is to ensure that the health checker stays robust against transient failures (e.g., localized failures in network connectivity).

One reason why the threshold is stricter for servers in the dequeue cluster pool is to avoid a complete starvation of a given tier. For example, since the lowest tier may contain only 25% of the application servers, it might be possible to completely starve messages for the lowest tier if 25% or more of the application servers in the dequeue cluster cannot dequeue from a given broker. In general, when a large fraction of application servers cannot dequeue from a given broker, it may have a greater impact on performance (e.g., idle application servers) and fair usage (e.g., advantage for message residing on a higher tier).

Lack of Application Servers Reporting Broker Health

Since mem-cache 287 may be used to report broker death from individual application servers, health checker 255 may often have incomplete data (e.g., not all application servers may report information about broker health) and some of the reasons include: 1) application servers restarting and erasing prior values; 2) list of application servers growing or shrinking which may result in redistribution and loss of prior values; and 3) transient failures at a given application server which may result in gaps in reporting. Thus, using quorum logic 252, when health checker 255 finds out that an application server has failed to report broker health, it may regard that the application server's connectivity to the broker remains unchanged. Consider an example of 30 application servers in a cluster, where health checker 255 attempts to read a list of failed brokers from mem-cache 287 and finds out that 10 of those application servers are reporting that broker A failed, while 5 application servers report no problems with broker A, and the rest of the 15 application servers do not report at all. In this case, since a quorum is lacking, health checker 255 may interpret the lack of data from the 15 application servers to indicate that broker A's status remains unchanged (e.g., connectivity to the broker for half the application server reinforce the status quo as ACTIVE or INACTIVE state). Hence, a broker is marked INACTIVE if there is data from a sufficiently large number of reporting application servers to indicate that the broker has failed. The number that is regarded as sufficient to have a quorum is not limited to this example and that any percentage, such 50% or more, 60%, 75%, etc., may be determined or regarded as sufficient to have the quorum.

Flipping the Switch

Once health checker 255 has determined that the broker status has changed, it may perform a series of corrective actions, such as when an ACTIVE broker is found to be INACTIVE, health checker 255 may update QPID_BROKER table and invalidate the list of broker status in mem-cache 287 (to prevent the router from allocating new queues on the failed broker) and subsequently, perform a series of corrective actions as follows: 1) router sweeper 256 to reassign queues previously owned by the INACTIVE broker to the remaining, ACTIVE BROKER; and 2) disaster recovery sweeper 258 is triggered to migrate messages from messages from INACTIVE broker to the remaining, ACTIVE broker. In one embodiment, the two actions are performed serially, one after another (e.g., disaster recovery sweeper 258 waits for router sweeper job to finish). This is because disaster recovery sweeper 258 may not migrate messages from the INACTIVE broker, unless it obtains a destination queue on the ACTIVE broker.

After the router sweeper job runs, all incoming messages may be sent to a destination queue on the ACTIVE broker (even for application servers that can still connect to the INACTIVE broker) and once disaster recovery sweeper 258 finishes, the unprocessed messages from the INACTIVE broker may have been copied to the ACTIVE broker. In case of any messages that fail to transfer, if the number of failed messages is below 100, HADR sweeping marks all messages in the message store from READY to FAILED_TO_SWEEP state. This way the messages may be manually swept or simply discarded.

If a previously INACTIVE broker becomes ACTIVE (e.g., number of occurrences falls below the threshold) during disaster recovery sweeper message migration, health checker 255 may delay changing the status to ACTIVE until after disaster recovery sweeper 258 is finished. In the event of application server failure, another health checker will continue the sweeper job. This is to avoid making any assumptions about the state of an INACTIVE broker that re-joins and so that the broker can have all prior messages erased or contain duplicate messages, which are handled via the message store table. After disaster recovery sweeper 258 may indicate that all dangling messages that may have been lost from the INACTIVE broker are recovered from the message store, the broker state is updated to ACTIVE in the QPID_BROKER table, indicating that it is safe for the routing table to send messages to the newly ACTIVE broker.

Qpid High Availability Implementation

Upon application server start up, the task is invoked (e.g., MessageQueueProcessorInititalizer startup is invoked) and the following sequence of operations that happen when the startup task is invoked: initialize Qpid Session Pools to iterate over the configured Qpid brokers and connect to each of them and initialize a session pool for the respective brokers. This task spins until it is able to connect to one of the configured brokers and on connecting to the broker, it initializes the session pool for that Qpid broker and exits. A Qpid reconnect task is scheduled to run after the above Qpid initialization task returns successfully. This task connects to any Qpid broker to which connection could not be established. If all the Qpid brokers are connected, then the task blocks and waits for an event notification which is fired by the Qpid listener. A Qpid reconnect task is scheduled to run after the above Qpid initialization task returns successfully and this task reconnects to any Qpid broker to which connection couldn't be established. If all the Qpid brokers are connected, then the task may block and wait for an event notification which is fired by monitor 254 to reconnect again.

Multi-Broker State

In some embodiments, the pool (e.g., QpidBrokerToSessionPool) singleton class may hold a mapping of live brokers and their session pools. The application Start up Code initializes the QpidBrokerToSessionPool mapping with one entry of an active broker and on detection of a broker failure, monitor 254 removes the entry for the broker in this map. Further, for example, a Qpid JMS connection failure detection may be made using monitor 254, such as on initializing a JMS connection, monitor 254 may be set up on the JMS connection and invoked in the event of a failure in the JMS connection. On occurrence of the event, the following may be performed: cleaning up the broker that failed from the multi-broker state (e.g., broker to session pool map), cleanly shutting down the session pool for the broker that faced connection loss, send an event to re-initialize the session pool, if the connection is a dequeue connection, it publishes this information to the dequeue cluster.

Broker Health Thread

Upon application server startup, post initialization of the session pool (e.g., Qpid Session Pool) and a broker health check thread is started. The thread runs on each of the application servers and does the following: the broker health checker thread tracks the brokers' status from the view of the local application server and reports this information to mem-cache 287, while the thread tries to acquire a distributed lock and uses the global knowledge of various broker status views (e.g., from mem-cache 287) to mark ACTIVE brokers that are used for enqueues. It takes the opportunity to update the broker table with the global agreed state for each of the brokers available in the system and reports it to the broker table. It kicks off the router task to re-compute the routing table if broker states change. When a broker global state change occurs from active to inactive (e.g., application servers reporting that a server is down), then the centralized task kicks off the disaster recovery sweeper 258 which moves messages from the transaction table. If there are other active brokers, the messages are ported to the other active Qpid broker, else the messages are moved to an existing infrastructure (e.g. AQ infrastructure). The thread loops around to a process and continues to report broker state to mem-cache 287 and periodically validates connections to ACTIVE brokers used for enqueues.

Routing & High Availability

In one embodiment, if a routing table is not available at the start of the process, a broker or identification (ID) table may be used by an application server to push all messages that are enqueued at this point to a reserved queue on the corresponding broker. For example, the reserved queue may be detected by its ID in the ID table, where the ID for the reserved queue may include a unique ID, such as the lowest ID number of all for easier identification. If there are no active brokers available, the message may automatically be routed to the queue (e.g., AQ) at this point and the message dequeued before the router is computed is put back into the reserved queue. They are looped around in the reserved queue until the routing table is computed, while the queue (e.g., MessageQueueRepostToCorrectQueue) is revisited with this in mind. Once the routing table is computed everything gets to normal, the messages are routed to the active broker that is agreed upon by all the application servers in the cluster.

In the event of a broker failure, the router could return invalid broker identifications (Ids) whose connections are already lost. This may be detected by using the broker Id to session pool map that is kept up-to-date as the source truth. On detection, the message is enqueued to any other active broker that is currently active and into its reserved queue. Further, dequeues on a broker which has failed may not happen as the connection is lost to that broker.

High Availablity for the Dequeue Cluster

If an application server acquires a slot to join the Qpid dequeue cluster, an object (e.g., QpidQueueProcessor object) is invoked and it initializes connection to Qpid. Connection may be established to all configured brokers and like the Qpid initializer, if the connection could be established to at least one broker, the QpidQueueProcessor may retain its position in the cluster. A thread periodically tries to connect to all other brokers to which dequeue connections were not established. When connections to all brokers is lost, the QpidQueueProcessor is unsubscribed out of the dequeue cluster, while a dequeue cluster thread goes through its usual iterations of making the application server join a dequeue cluster.

The example of illustrating the use of technology disclosed herein should not be taken as limiting or preferred. This example sufficiently illustrates the technology disclosed without being overly complicated. It is not intended to illustrate all of the technologies disclose.

A person having ordinary skill in the art will appreciate that there are many potential applications for one or more implementations of this disclosure and hence, the implementations disclosed herein are not intended to limit this disclosure in any fashion.

Figure 3:
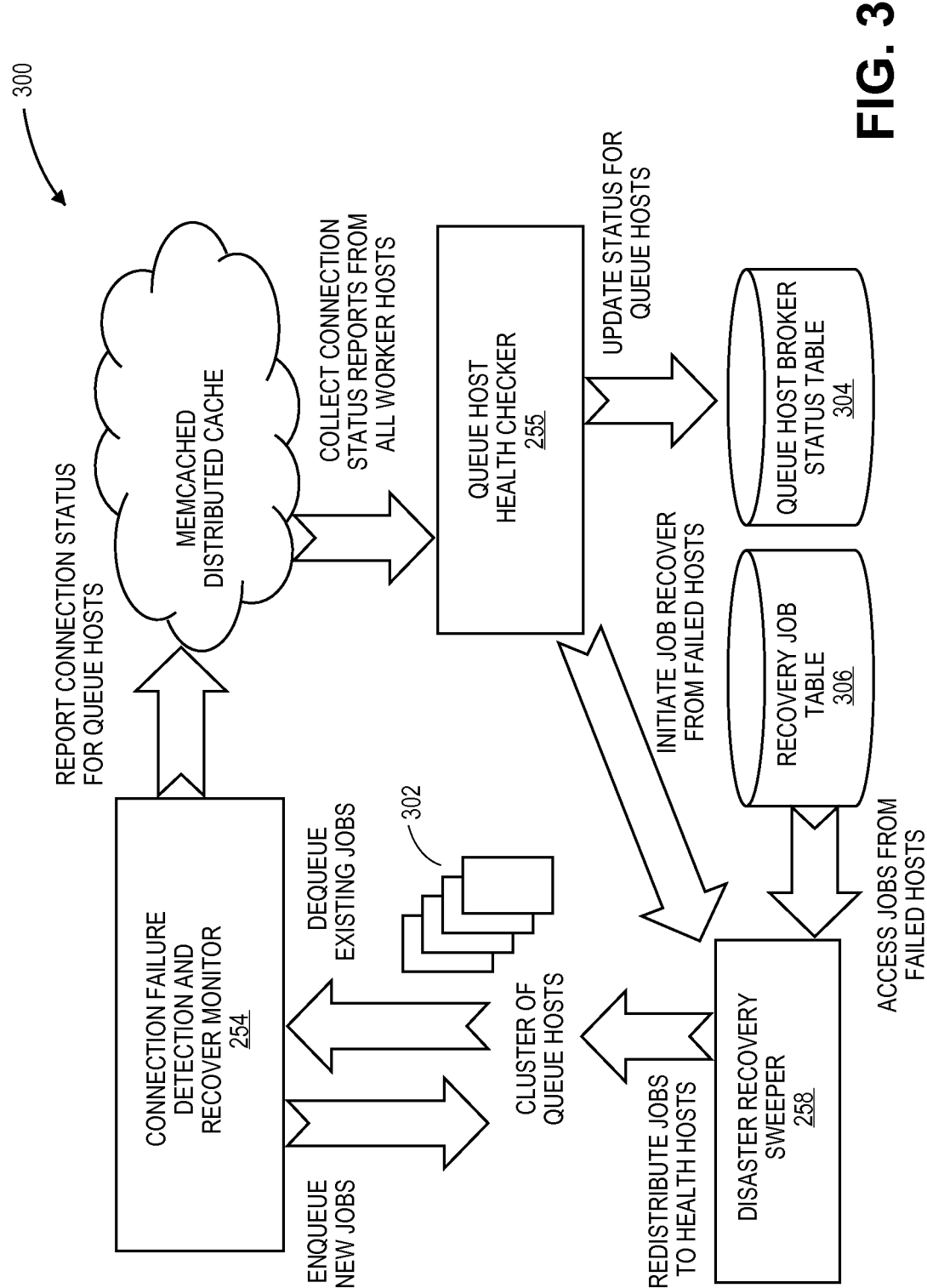
FIG. 3 illustrates an architecture for facilitating a quorum-based coordination of broker health for management of resources for application servers in a multi-tenant environment in an on-demand services environment according to one embodiment.

FIG. 3 illustrates an architecture 300 for facilitating a quorum-based coordination of broker health for management of resources for application servers in a multi-tenant environment in an on-demand services environment according to one embodiment. It is to be noted that for brevity and ease of understanding, most of the processes and components described with reference to FIGS. 1 and 2 are not repeated here with respect to FIG. 3 or with reference to any of the subsequent figures. In one embodiment, architecture 300 includes monitor 254 that maintains communication with a cluster of queue hosts or brokers 302 (e.g., enqueue new jobs, dequeue existing jobs, etc.) and reports connection status for and of queue hosts to mem-cache 287. Mem-cache 287 then collects the connection status reports from all worker nodes, via monitor 254, and forwards them on to health checker 255. Health checker 255 updates the corresponding broker table 304 with the latest status of queue hosts based on the received status reports.

Furthermore, in one embodiment, based on the status report, health checker 255 communicates with disaster recovery sweeper 258 to facilitate initiation of job recovery from failed queue hosts. Disaster recovery sweeper 258 redistributes jobs to one or more queue hosts at the cluster of queue hosts 302.

Figure 4A:
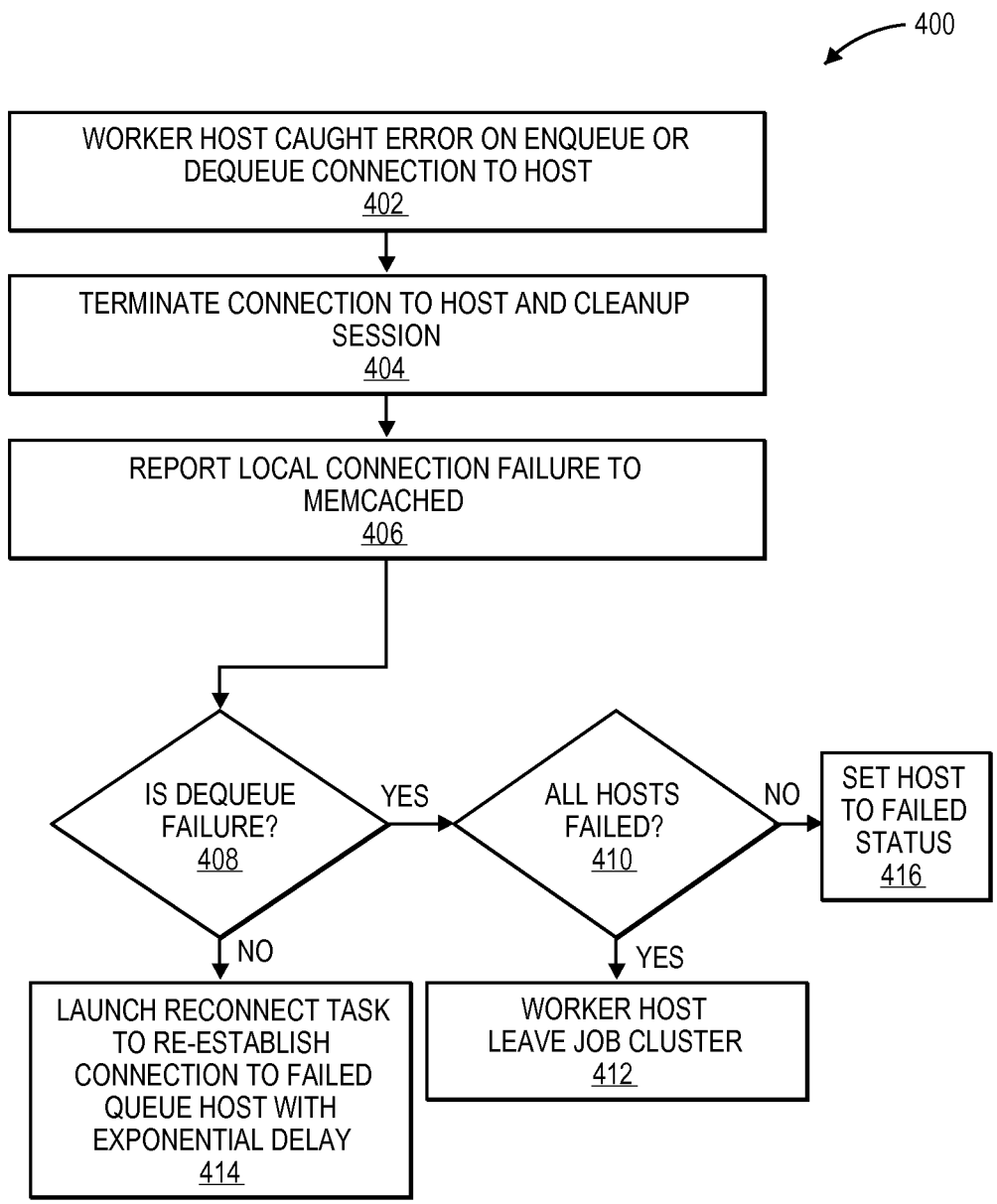
FIG. 4A illustrates a method for facilitating quorum-based coordination of broker health for management of resources for application servers in a multi-tenant environment in an on-demand services environment according to one embodiment.

FIG. 4A illustrates a method 400 for facilitating quorum-based coordination of broker health for management of resources for application servers in a multi-tenant environment in an on-demand services environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by thread resource management mechanism 110 of FIG. 1.

Method 400 relates to and describes a connection failure detection and recovery transaction involving the monitor 254 of FIGS. 2-3. Method 400 begins at block 402 with a worker host catching an error on enqueue or dequeue connection to the queue host or broker, followed by termination of the connection to the queue host and the cleanup session at block 404. At block 406, the location connection failure is reported to mem-cache. At decision block 408, a determination is made as to whether the failure is a dequeue failure. If not, at block 414, the reconnection task is launched to reestablish the connection to the failed queue host with exponential delay. If yes, however, a determination is made as to whether all queue hosts have failed. If they have, the worker host leaves the job cluster at 412. If not, the queue host is set to failed state at block 416.

Figure 4B:
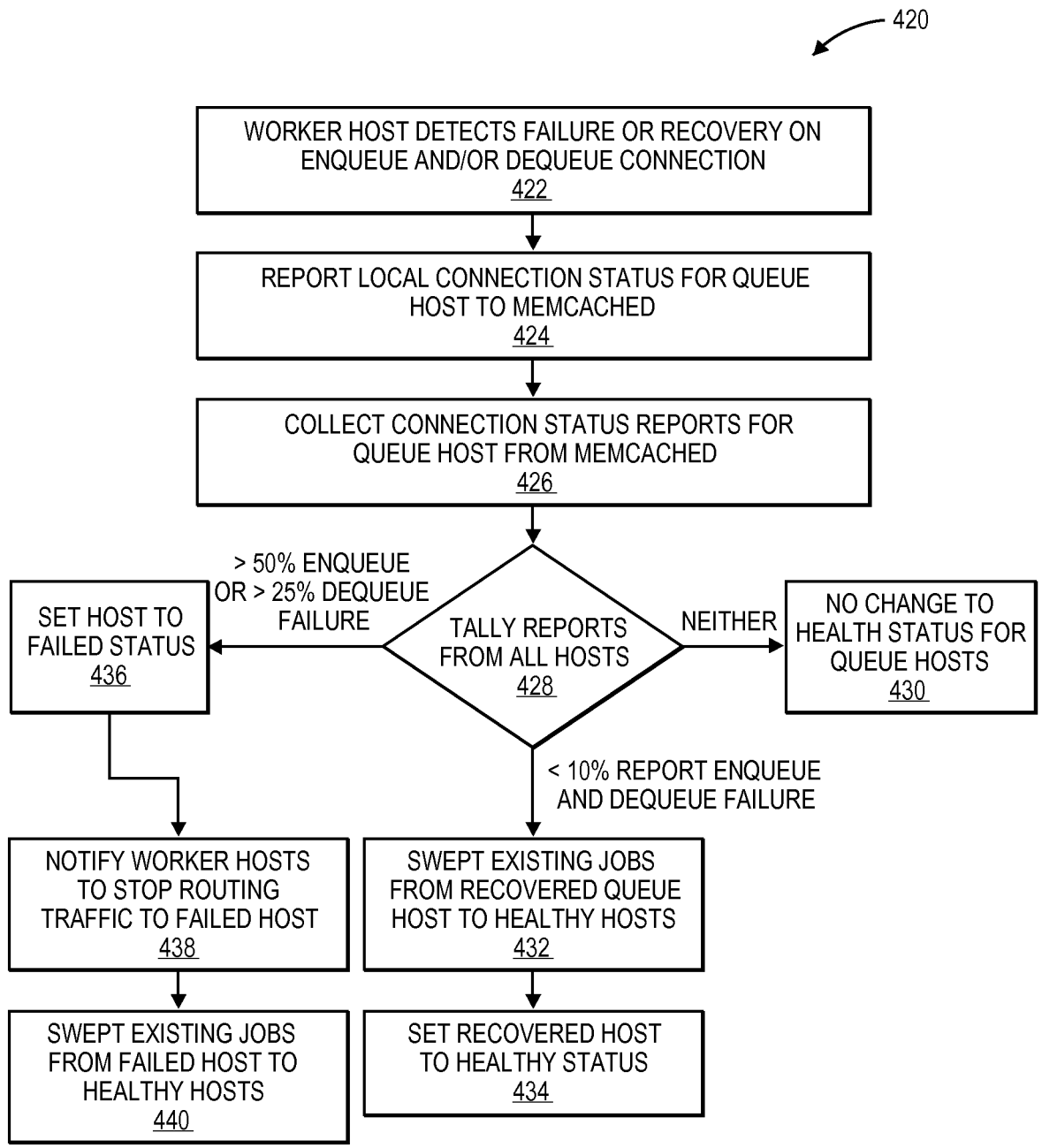
FIG. 4B illustrates a method for facilitating a quorum-based coordination of broker health for management of resources for application servers in a multi-tenant environment in an on-demand services environment according to one embodiment.

FIG. 4B illustrates a method 420 for facilitating a quorum-based coordination of broker health for management of resources for application servers in a multi-tenant environment in an on-demand services environment according to one embodiment. Method 420 may be performed by processing logic that may comprise hardware (e.g., circuitry, dedicated logic, programmable logic, etc.), software (such as instructions run on a processing device), or a combination thereof. In one embodiment, method 420 may be performed by thread resource management mechanism 110 of FIG. 1.

Method 420 relates to and describes a quorum-based voting transaction involving the queue host health checker 255 of FIGS. 2-3. Method 420 begins at block 422 with a worker host detecting a failure or recovery on an enqueue connection and/or a dequeue connection. At block 424, the location connection status for the queue host is reported to mem-cache. At block 426, the connection status reports are collected for the queue host from mem-cache. At block 428, status reports from all the hosts are tallied and if the failures include more than 50% enqueue failures or more than 25% dequeue failures, the host is set to failed status at block 436. At block 438, worker hosts are notified to stop routing future traffic to the failed host and, at block 440, any existing jobs are swept from the failed host to one or more of healthy hosts.

Referring back to block 428, if the failures include less than 10% of worker hosts reporting enqueue or dequeue failures, any existing jobs are swept from the recovered queue host to one or more of the healthy queue hosts at block 432. At block 434, the recovered host is set to healthy status. Referring back to block 428, if neither, no change is made to the health status of the queue hosts.

FIG. 4C illustrates a transaction sequence 450 facilitating a quorum-based coordination of broker health for management of resources for application servers in a multi-tenant environment in an on-demand services environment according to one embodiment. Transaction sequence 450 may be performed by processing logic that may comprise hardware (e.g., circuitry, dedicated logic, programmable logic, etc.), software (such as instructions run on a processing device), or a combination thereof. In one embodiment, transaction sequence 450 may be performed by thread resource management mechanism 110 of FIG. 1.

Transaction sequence 450 relates to and describes a failure and recovery handling for queue host health checker transaction involving the queue host health checker 255 of FIGS. 2-3. In one embodiment, transaction sequence 450 begins with the queue host cluster 302 collecting connection status report for all queue hosts 452 and providing the collection to the health checker 255. At the health checker 255, the fractions of worker hosts reporting enqueue and/or dequeue connection failures are tallied 454. The newly-failed queue hosts are marked as unhealthy to stop any future routing traffic 456 and communicated to broker table 304 and then, the recovery of jobs on previously-failed and newly-failed queue hosts is initiated 458. At the disaster recovery sweeper 258, existing jobs from failed queue hosts are accessed 462, followed by re-enqueuing of the existing jobs to health queue hosts 460 in the queue host cluster 302. The notification of the completion of the recovery for existing jobs is provided to the health checker 255 and in return, the newly-recovered queue hosts are marked as healthy 466 at the broker table 304.

Figure 5:
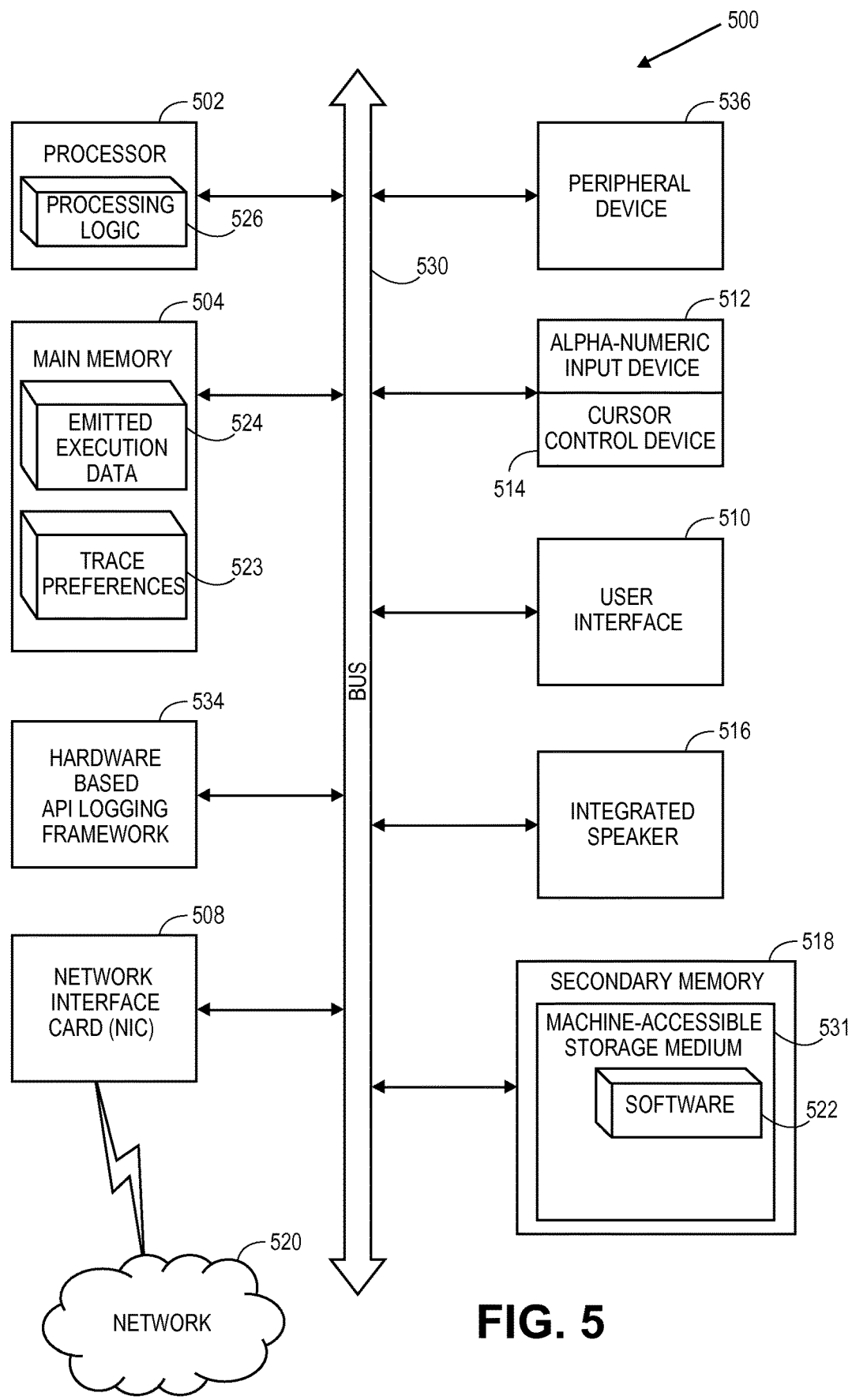
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 290 of FIG. 1 and FIG. 2, respectively. In alternative embodiments, the machine may be connected (e.g., networked) to other machines in a network (such as host machine 100 of FIG. 1 connected with client machine 290 over network 285 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
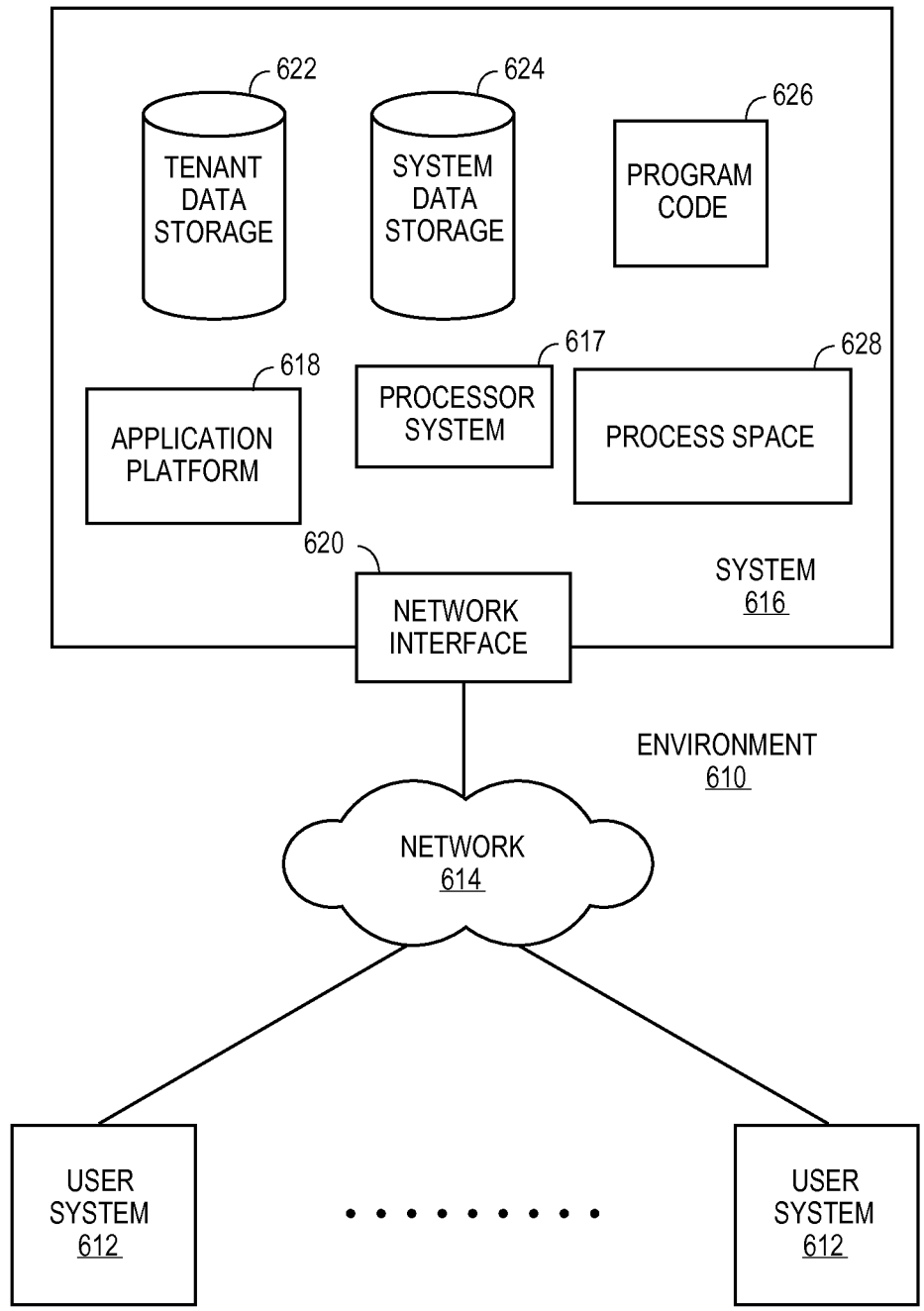
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
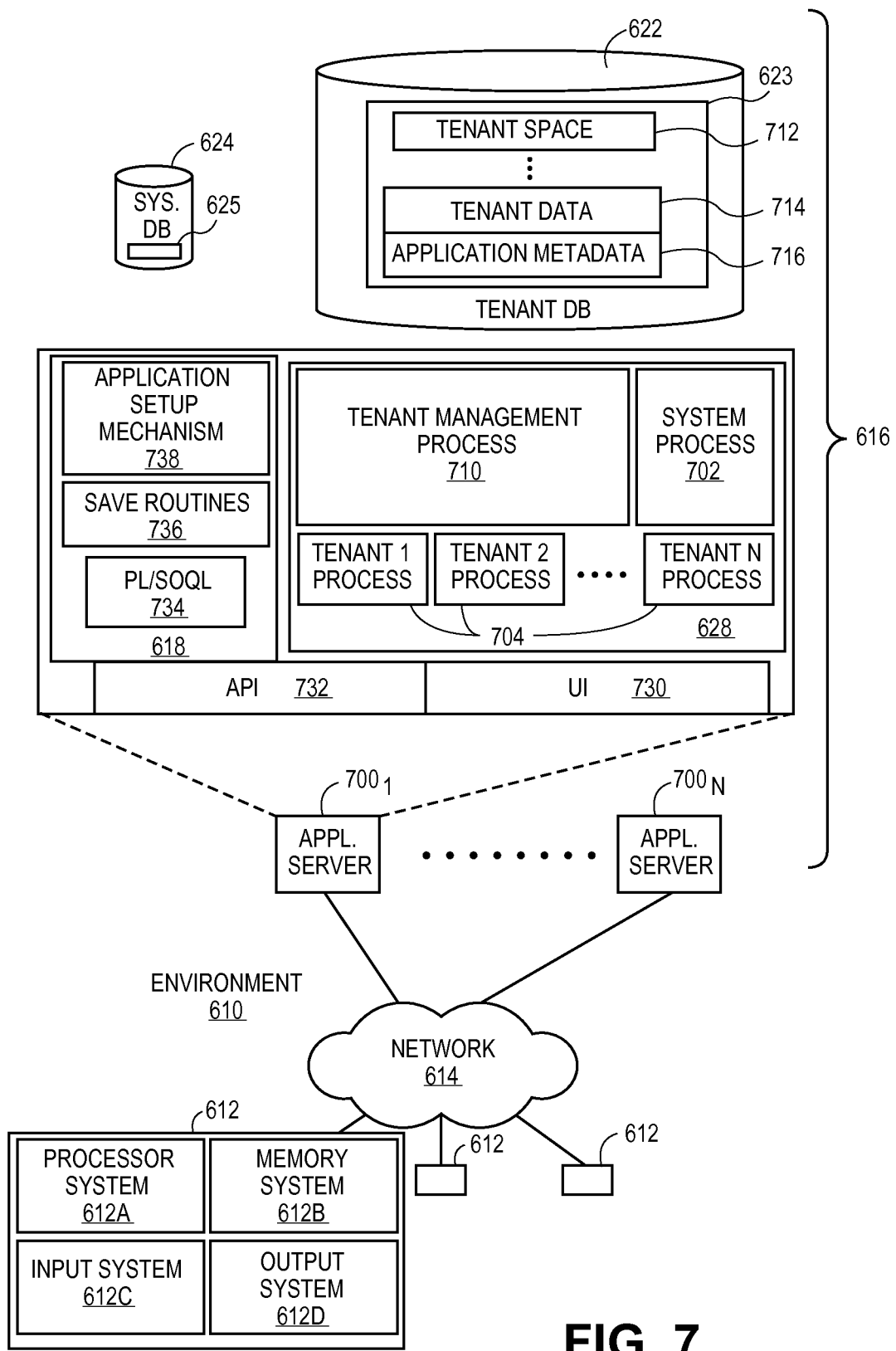
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700ₙ, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
monitoring, by a health checker of the database system, resource distribution health of message queue brokers managing resource domains having worker nodes and thread resources for processing job requests, wherein managing includes routing of the job requests to job queues associated with application servers in a multi-tenant resource distribution environment and in communication over a network, wherein each message queue broker is associated with at least one resource domain having a set of working nodes and a set of thread resources;
generating, by the health checker of the database system, a status report associated with a first message queue broker based on quorum-based votes casted by other message queue brokers, wherein the status report to indicate fair or unfair management of a first resource domain by the first message queue broker, wherein each message queue broker participates in a quorum-based voting system to vote to rate one or more of the message queue brokers on their management of one or more of the resource domains; and
classifying, based on based votes, the first message queue broker as one of successful, failed and recoverable, and failed and unrecoverable,
wherein the first message queue broker when classified as successful, the first message queue broker remains active such that a set of job requests distributed to the first resource domain associated with the first message queue broker is routed to one or more of the job queues without interruption,
wherein the first message queue broker when classified as failed and recoverable, the first message queue broker is recovered from failure and turned active to resume routing of the set of job requests, and
wherein the first message queue broker when classified as failed and unrecoverable, the first message queue broker is retired, and the set of job requests is distributed to a second message queue broker managing a second resource domain.

2. The method of claim 1, wherein the message queue broker is classified as failed and recoverable if, based on the quorum-based votes, a percentage of failed queues is less than a first threshold percentage and greater than a second threshold percentage, wherein the first message queue broker serves as a master broker, while the other message queue brokers are peer brokers.

3. The method of claim 2, wherein the message queue broker is classified as successful if, based on the quorum-based votes, the percentage is lower than the second threshold percentage.

4. The method of claim 1, wherein the job requests are held in a temporary cache or temporarily routed to another message queue broker, if the message queue broker is classified as failed and recoverable.

5. A database system comprising:
a health-checker server device having a memory to store instructions, and a processing device to execute the instructions, the health-checker server device to perform operations comprising:
monitoring resource distribution health of message queue brokers managing resource domains having worker nodes and thread resources for processing job requests, wherein managing includes routing of the job requests to job queues associated with application servers in a multi-tenant resource distribution environment and in communication over a network, wherein each message queue broker is associated with at least one resource domain having a set of working nodes and a set of thread resources;
generating, by the health checker of the database system, a status report associated with a first message queue broker based on quorum-based votes casted by other message queue brokers, wherein the status report to indicate fair or unfair management of a first resource domain by the first message queue broker, wherein each message queue broker participates in a quorum-based voting system to vote to rate one or more of the message queue brokers on their management of one or more of the resource domains; and
classifying, based on the quorum-based votes, the first message queue broker as one of successful, failed and recoverable, and failed and unrecoverable,
wherein the first message queue broker when classified as successful, the first message queue broker remains active such that a set of job requests distributed to the first resource domain associated with the first message queue broker is routed to one or more of the job queues without interruption
wherein the first message queue broker when classified as failed and recoverable, the first message queue broker is recovered from failure and turned active to resume routing of the set of job requests, and
wherein the first message queue broker when classified as failed and unrecoverable, the first message queue broker is retired, and the set of job requests is distributed to a second message queue broker managing a second resource domain.

6. The database system of claim 5, wherein the message queue broker is classified as failed and recoverable if, based on the quorum-based votes, a percentage of failed queues is less than a first threshold percentage and greater than a second threshold percentage, wherein the first message queue broker serves as a master broker, while the other message queue brokers are peer brokers.

7. The database system of claim 6, wherein the message queue broker is classified as successful if, based on the quorum-based votes, the percentage is lower than the second threshold percentage.

8. The database system of claim 5, wherein the job requests are held in a temporary cache or temporarily routed to another message queue broker, if the message queue broker is classified as failed and recoverable.

9. At least one non-transitory machine-readable medium having stored thereon instructions which, when executed by a health-checker processing device, causes the health-checker processing device to perform operations comprising:

monitoring resource distribution health of message queue brokers managing resource domains having worker nodes and thread resources for processing job requests, wherein managing includes routing of the job requests to job queues associated with application servers in a multi-tenant resource distribution environment and in communication over a network, wherein each message queue broker is associated with at least one resource domain having a set of working nodes and a set of thread resources;

generating, by the health checker of the database system, a status report associated with a first message queue broker based on quorum-based votes casted by other message queue brokers, wherein the status report to indicate fair or unfair management of a first resource domain by the first message queue broker, wherein each message queue broker participates in a quorum-based voting system to vote to rate one or more of the message queue brokers on their management of one or more of the resource domains; and classifying, based on the quorum-based votes, the first message queue broker as one of successful, failed and recoverable, and failed and unrecoverable, wherein the first message queue broker when classified as successful, the first message queue broker remains active such that a set of job requests distributed to the first resource domain associated with the first message queue broker is routed to one or more of the job queues without interruption, wherein the first message queue broker when classified as failed and recoverable, the first message queue broker is recovered from failure and turned active to resume routing of the set of job requests, and wherein the first message queue broker when classified as failed and unrecoverable, the first message queue broker is retired, and the set of job requests is distributed to a second message queue broker managing a second resource domain.

10. The non-transitory machine-readable medium of claim 9, wherein the message queue broker is classified as failed and recoverable if, based on the quorum-based votes, a percentage of failed queues is less than a first threshold percentage and greater than a second threshold percentage, wherein the first message queue broker serves as a master broker, while the other message queue brokers are peer brokers.

11. The non-transitory machine-readable medium of claim 10, wherein the message queue broker is classified as successful if, based on the quorum-based votes, the percentage is lower than the second threshold percentage.

12. The non-transitory machine-readable medium of claim 9, wherein the job requests are held in a temporary cache or temporarily routed to another message queue broker, if the message queue broker is classified as failed and recoverable.

* * * * *